United States Patent [19]

Prosenbauer

[11] Patent Number: 5,336,126
[45] Date of Patent: Aug. 9, 1994

[54] APPARATUS FOR OBTAINING NUTRITIVE SUBSTANCES BY EXTRACTING BONES AND MEAT WHICH OPTIONALLY ADHERES THEREON

[76] Inventor: Otto Prosenbauer, Innstrasse 23-25, Vienna, Austria, A 1201

[21] Appl. No.: 30,095
[22] PCT Filed: Sep. 4, 1991
[86] PCT No.: PCT/AT91/00100
  § 371 Date: Mar. 11, 1993
  § 102(e) Date: Mar. 11, 1993
[87] PCT Pub. No.: WO92/03930
  PCT Pub. Date: Mar. 19, 1992

[30] Foreign Application Priority Data
Sep. 12, 1990 [AT] Austria ................. 1852/90

[51] Int. Cl.$^5$ ............ A22C 17/04; A22C 9/00
[52] U.S. Cl. ........................ 452/138; 452/135; 452/141
[58] Field of Search ........... 452/135, 138, 139, 141

[56] References Cited

U.S. PATENT DOCUMENTS

| | | | |
|---|---|---|---|
| 3,154,805 | 11/1964 | Egee et al. | 452/139 |
| 3,372,723 | 3/1968 | Elich | 452/138 |
| 3,396,768 | 8/1968 | Kurihara | 452/138 |
| 3,580,725 | 5/1971 | Kuster | 99/7 |
| 3,734,000 | 5/1973 | Ziener | 99/539 |
| 4,536,920 | 8/1985 | Amersfoort | 452/138 |
| 4,575,899 | 3/1986 | Prosenbauer | 452/138 |
| 4,637,094 | 1/1987 | Matsubayashi | 452/138 |
| 4,791,705 | 12/1988 | Corominas | 452/141 |
| 4,815,165 | 3/1989 | Gibson | 452/141 |
| 4,899,890 | 2/1990 | Ewing et al. | 452/138 |
| 5,205,777 | 4/1993 | Hohenester | 452/141 |

FOREIGN PATENT DOCUMENTS

| | | |
|---|---|---|
| 374092 | 3/1984 | Austria . |
| 0127608 | 12/1984 | European Pat. Off. . |
| 0274997 | 7/1988 | European Pat. Off. . |
| 220378 | 7/1909 | Fed. Rep. of Germany . |
| 1077558 | 3/1960 | Fed. Rep. of Germany . |
| 2157850 | 6/1973 | Fed. Rep. of Germany . |
| 2630325 | 1/1978 | Fed. Rep. of Germany . |
| 2189098 | 1/1974 | France . |
| 2209925 | 5/1974 | France . |
| 2330323 | 6/1977 | France . |
| 1162166 | 8/1969 | United Kingdom . |

*Primary Examiner*—Willis Little
*Attorney, Agent, or Firm*—Townsend and Townsend Khourie and Crew

[57] ABSTRACT

An apparatus for obtaining nutritive substances by extraction from bones and meat adhering thereon has a receptacle (2) for receiving bones and an extracting liquid, preferably water. In the receptacle at least one stirring element (7) is provided and the receptacle (2) is tiltable with a horizontal shaft (3) so that is content can be discharged onto a coarse sieve (15) positioned within a trough (14) for separating the bones and the coarse components from the liquid and the fine components. Below the coarse sieve (15) is a gutter which leads to a rotating sieve (23) the sieve openings of which are smaller than those of the coarse sieve (15). At least one stripper engages the rotating sieve (23) and below the rotating sieve (23) there is a collecting container (30) for the liquid, a discharge conduit (34) extending from this container. This results in a space-consuming construction and permits a fractional separation of the useful components of the bones and the meat adhering thereto.

15 Claims, 3 Drawing Sheets

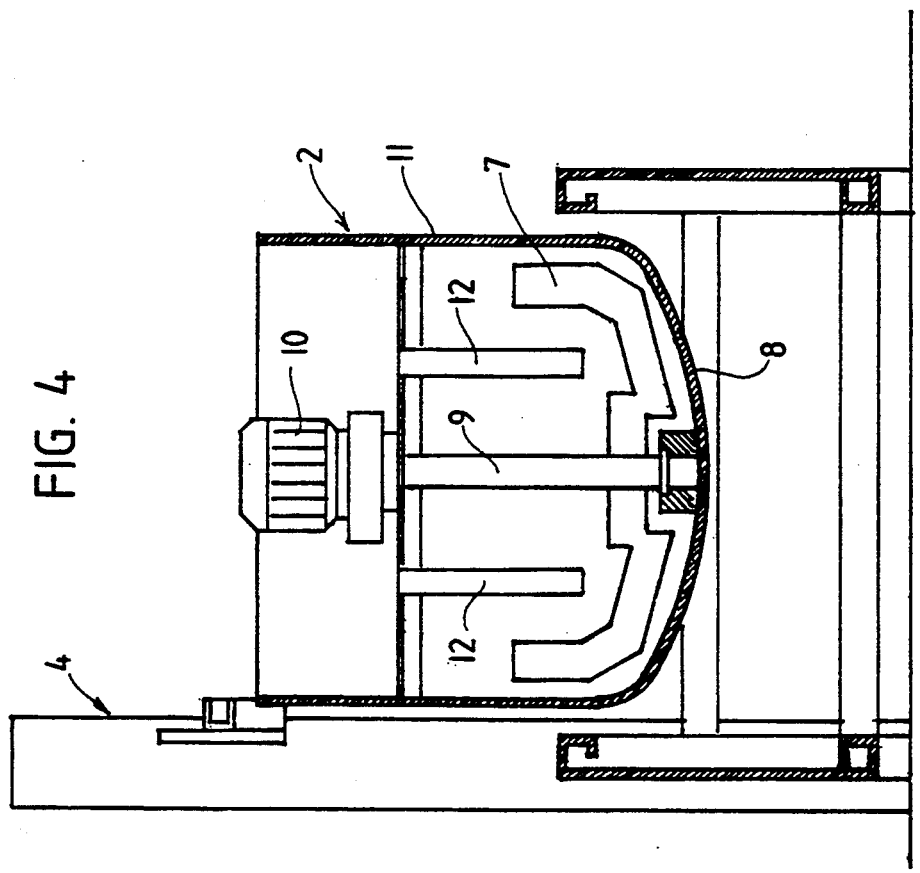
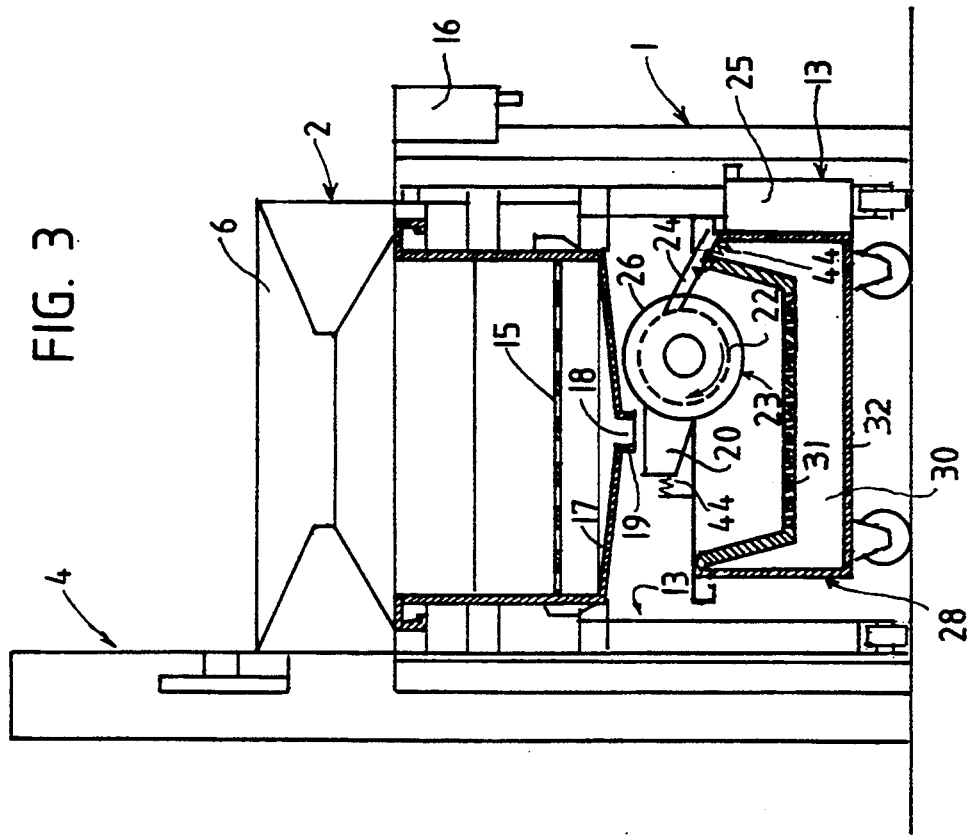

APPARATUS FOR OBTAINING NUTRITIVE SUBSTANCES BY EXTRACTING BONES AND MEAT WHICH OPTIONALLY ADHERES THEREON

BACKGROUND OF THE INVENTION

The invention refers to an apparatus for obtaining nutritive substances by extracting bones and meat which optionally adheres thereon, comprising a receptacle for accommodating the bones and the liquid used for extracting, preferably water, in which receptacle at least one rotating stirring member is provided, the receptacle being tiltable about a horizontal axis so that its content gets to a coarse sieve for separating the bones and the coarse elements from the liquid and the fine elements.

As is well-known, bones which are obtained by manually dividing slaughtered animals contain, besides adhering tissue and meat, also a considerable content of high-quality nutritive substances. An apparatus for retrieving them, disclosed in Austrian patent 374,092, places the bones in water containing receptacle, stirs and, optionally, strikes the contents and then subjects the contents to a sieving process for collection of the liquid and fine constituents beneath the sieve. The residual mass containing the bones is fed from the sieve into a press cylinder and is pressed for obtaining the residual liquid. A high portion of the nutritive substances in or on the bones can thereby be obtained; however, the separation of the liquid constituents from the residual constituents is too coarse. Namely, if the sieve is made too fine, too much of the nutritive substances get into the press chamber, where they can only be partially recovered. If, however, the sieve has comparatively large penetration openings, fine bone parts or fibers may pass, which in most cases is undesirable.

From German published patent application DE-OS 2,157,850 it is known to obtain useful substances from bones and meat adhering thereon by comminuting the cooled starting material and to mix it with water or ice, whereupon the suspension obtained is centrifuged into a solid phase and a liquid phase. This procedure requires great effort in apparatus and has the disadvantage that a considerable heating up occurs during centrifuging which must be compensated by supplying additional cooling.

SUMMARY OF THE INVENTION

The invention DE-A 1,077,558 discloses an apparatus for obtaining the meat remaining on extracted bones in which the material to be treated is introduced in a rotating hollow drum provided with slots on its periphery. In the interior of the drum the meat is scraped off the bones by knives fixed to the jacket of the drum. The meat pieces are fed through slots of the drum with supplied boiling water and fall into a collection conduit from which they are transparted into inclined troughs. In these troughs the fat is dissolved and entrained bone fragments can be deposited. From the troughs the water transporting the meat pieces is conveyed by bucket wheels into an elevated collection channel which feeds the meat pieces to a container in which a stripper removes the fat floating on the water. By means of a further bucket wheel the meat pieces are conveyed with a chute to a sieve for removing the water. This apparatus requires a considerable effort and requires the process to be stopped whenever the sieve, the channels or the troughs must be cleaned.

Lastly, GP-A 1,162,166 discloses an apparatus in which broken bones and adhering meat pieces are supplied to a sieve drum from above by a conveyer. The components penetrating through the sieve jacket are collected by a tube and are conveyed to a further sieve drum from above. Since the supplied material has only a short time to pass through the openings of the sieve drum, not all useful components are recovered.

SUMMARY OF INVENTION

The invention has as one of its objects to provide an improved apparatus, to avoid the disadvantage of the coarse separation, and to avoid breakdowns of the operation. The invention solves this task—starting from the initially described apparatus—by positioning coarse sieve within a trough from which an exit leads to a further sieve formed by a rotating sieve roller driven for rotation about a horizontal axis, the sieve openings of which being smaller than those of the coarse sieve. A supply trough accommodating the product discharging from the exit engages this sieve roller at the rising side and at least one stripper is provided for removing the residual matter engaging the sieve drum at the other side, springs bias the supply trough and, respectively, or the stripper against the sieve roller. A collecting container for the liquid is disposed below the rotating sieve, from which container a discharge conduit extends. Thereby, a finer separation of the extracting liquid containing the useful substances from the bones is obtained without causing breakdowns from a closure of the openings of the finer sieve because the stripper continuously cleans the rotating sieve so that fresh, cleaned sieve portions are always available for the separation process. The supply trough ensures a sealing between itself and the sieve roller so that no product supplied into the supply trough may by-pass the sieve roller. Further, the edge of the supply trough engaging the sieve roller acts as a stripper for those solid portions which may have passed the stripper positioned on the other side of the sieve roller. To dispose the supply trough on the rising side of the sieve roller enhances the sealing effect and has the advantage that the supplied product is taken along to above by the rotating sieve roller so that the product has a comparatively long time to penetrate through the openings of the sieve roller until it reaches the stripper disposed on the descending side of the sieve roller. Biasing the supply trough or the stripper with springs against the sieve roller enhances the sealing. To avoid excessive wear and to dampen the noise, sliding seal surfaces of the supply trough/and, respectively, or the stripper which engage the jacket of the sieve roller are preferably made of synthetic plastics material. Further, the present invention contemplates to provide both front edges of the sieve roller with radially extending flanges to avoid a liquid run-off at the front edges.

According to a further embodiment of the invention a fine filter, the sieve openings of which are smaller than those of the rotating sieve, is disposed within the collecting receptacle below the rotating sieve, which fine filter can preferably be suspended in the collecting receptacle. This enables a further fine separation, if this is desired, for example to separate out very fine bone fragments or the like. To avoid that coarser constituents which may have reached the collecting receptacle get into the final product, it is recommended to provide an additional filter, preferably a suction filter, surrounding the inlet opening of the discharge line within the collecting receptacle.

According to a preferred embodiment of the invention the trough accommodating the coarse sieve is supported on a chassis which is separable from the frame carrying the receptacle and defining a hollow space into which a further chassis carrying the collecting receptacle and the rotating sieve can be moved. The trough accommodating the coarse sieve as well as the collecting container together with the rotating sieve are therefore disconnectable from the remaining apparatus and, if desired, can be used separately. Further, storage during non-use is facilitated.

Suitably the trough carrying the coarse sieve can be tilted about a horizontal axis into a discharge position, preferably by hydraulic means including a hydraulic cylinder. This enables one to discharge the bones remaining in the trough by tilting the trough so that manual operation therefor is not needed. The use of hydraulic means for this tilting operation is recommended in particular for bigger apparatus. According to the invention, the axis about which the trough can be tilted, and the shaft by means of which the receptacle can be tilted, are suitably disposed parallel to each other and the trough can be tilted off the receptacle in its discharging position. This facilitates the positioning of a carriage for receiving the extracted bones.

BRIEF DESCRIPTION OF THE DRAWINGS

FIGS. 3 and 4 show cross sections taken along lines III—III and IV—IV, respectively, of FIG. 1.

DESCRIPTION OF THE PREFERRED EMBODIMENTS

Figure 1:
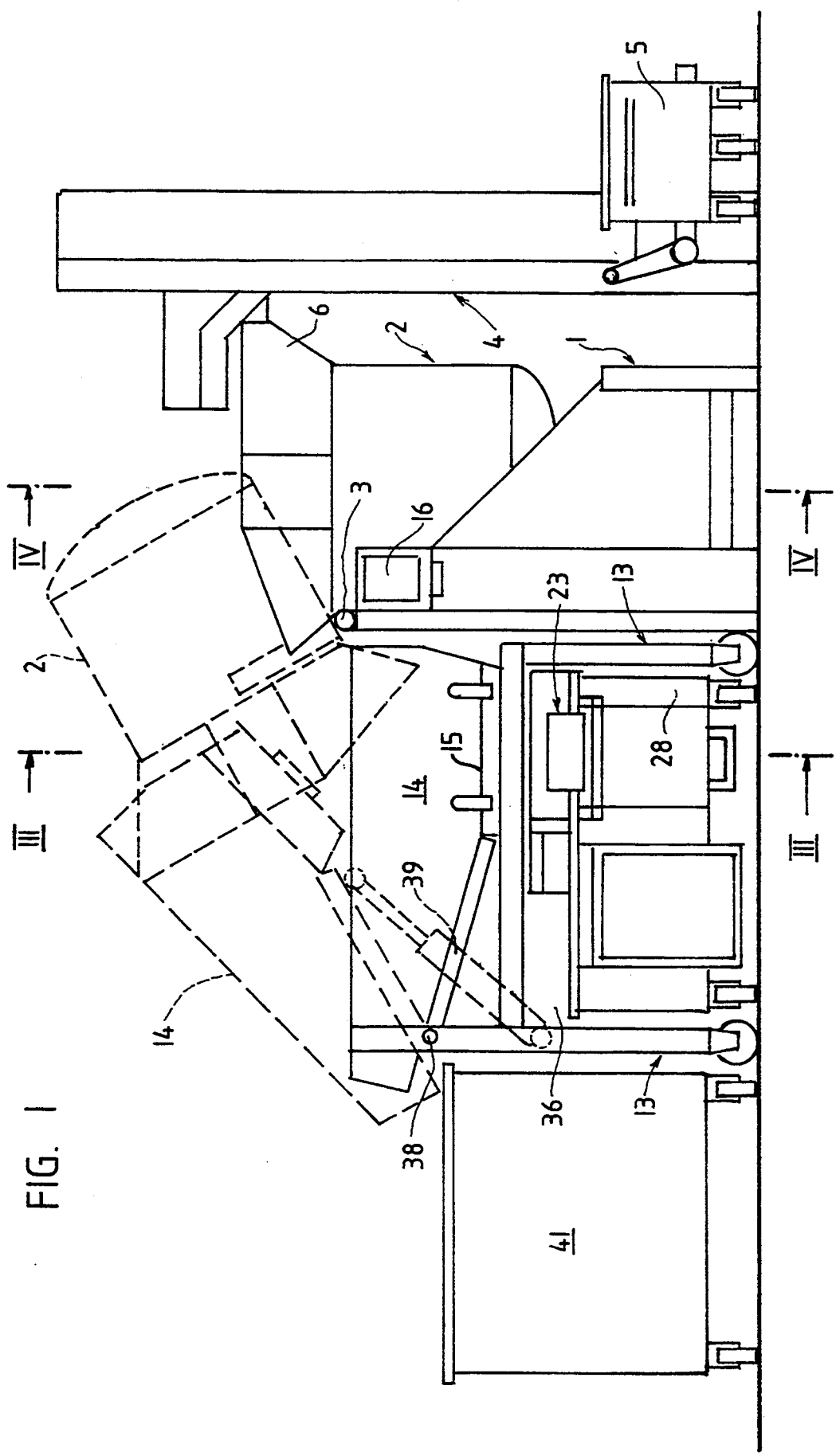
FIG. 1 shows a side view of the apparatus.

The apparatus has a stationary frame 1 carrying a receptacle 2 which is supported in the frame 1 on bearings for tilting with a horizontal shaft 3. The receptacle 2 accommodates the bones which optionally have adhering meat, and a liquid, particularly water, preferably with an addition of ice, for extracting the nutritive substances from the bones. For the supply of these starting products to the receptacle 2 a supply lift 4 is provided at the front side of the frame 1, and a carriage 5 for the bones or the like can be carried by the lift. In its lifted position the carriage is so tilted by the lift 4 that the content of the carriage falls into the upwardly open receptacle 2. To facilitate the supply, a frusto-conical collar 6 is provided on the upper edge of the receptacle 2. The substances introduced into the receptacle 2 can be stirred with stirring arms 7 (FIG. 4) fixed to a shaft 9 supported in bearing on the bottom 8 of the receptacle 2. The shaft 9 is driven by a motor 10 fixed to a support 11 extending across the receptacle 2. The support also carries two rods 12 protruding into the interior of the receptacle which extend parallel to the shaft 9 and intensify the stirring effect in the manner of baffles. A carriage 13 carrying a trough 14 in the bottom of which a coarse sieve 15 is inserted, can be positioned near that side of the frame 1 which does not face the lift 4. The contents of the receptacle 2 can be transferred into trough 14 by tilting the receptacle 2 with shaft 3 from its filling and stirring position shown in FIGS. 1 and 2 into its discharge position shown in broken lines in FIG. 1. The shaft 3 can be rotated with hydraulic means, not shown, provided with a hydraulic cylinder, and can be electronically operated from a switch box 16. If desired, the shaft 3 can also be rotated with an electric motor provided with suitable gears, instead of by the hydraulic means. The collar 6 extends to the side of the receptacle 2 which does not face the lift 4, but with a reduced height to facilitate the discharge of the receptacle content.

Suitably, the coarse sieve 15 is exchangeably disposed within the trough 14. The bottom 17 disposed below the coarse sieve 15 is inclined towards a gutter 18 consisting of two pieces, namely a funnel-like ring 19 surrounding the discharge opening of the bottom 17, and a supply trough 20 disposed below the ring 17 and open on one side. The bottom wall of the supply trough 20 at its open side laterally engages the sieve surface 21 of a rotating sieve 23 formed as a sieve roller 22 and slides on the seal while also establishing a seal. At the opposing side a stripper 24 of sheet metal slidingly engages the sieve surface 21 of the sieve roller 22, for directing the residuals retained by the rotating sieve 23 into a trough 25. The sieve roller 22 is driven for rotation about a horizontal axis and includes two front plates 26 bordering the sieve area 21 which have axle stubs 27 supported in bearings of a further carriage 28 and driven by a motor 29 provided with a control gear. To improve the sealing between the supply trough 20 or the stripper 24 and the sieve area 21, the supply trough 20 and the stripper 24 are both pressed against the sieve area 21 by means of springs 44. A further improvement of the sealing, a reduction of the wear and a dampening of the noise are obtained by providing the edges of the supply trough 20 or the stripper 24 engaging the sieve area 21 with sliding sealing surfaces of synthetic plastics material. In this manner, the product supplied by the supply trough 20 is conducted substantially loss-free through the rotating sieve 23. Below the rotating sieve 23 on carriage 28 is a collecting container 30 which also carries the supply trough 20 and into which a fine filter 31 is hung, the sieve openings of which are smaller than those of the rotating sieve 23, the sieve openings of which in turn are smaller than those of the coarse sieve 15. With this step-down of the diameter of the sieve holes a fractionation is possible. The bottom 32 of the collecting container 30 is provided with a depression 33 from which a discharge line 34 extends into which a suction pump 34' is inserted. A suction filter 35 in depression 33 overlies the inlet opening of this discharge line 34. The carriage 28 carrying the collecting container 30 and the rotating sieve 23 together with its motor 29 can be driven into a hollow space 36 of the carriage 13 carrying the trough 14 and can be fixed in its desired position by fixing means (not shown) so that the trough 20 is always kept below the ring 19 of the gutter 18. In a similar manner the carriage 13 can be fixed in its desired position on the frame 1 by means of fixing means 37, for example hooks and rings.

Figure 2:
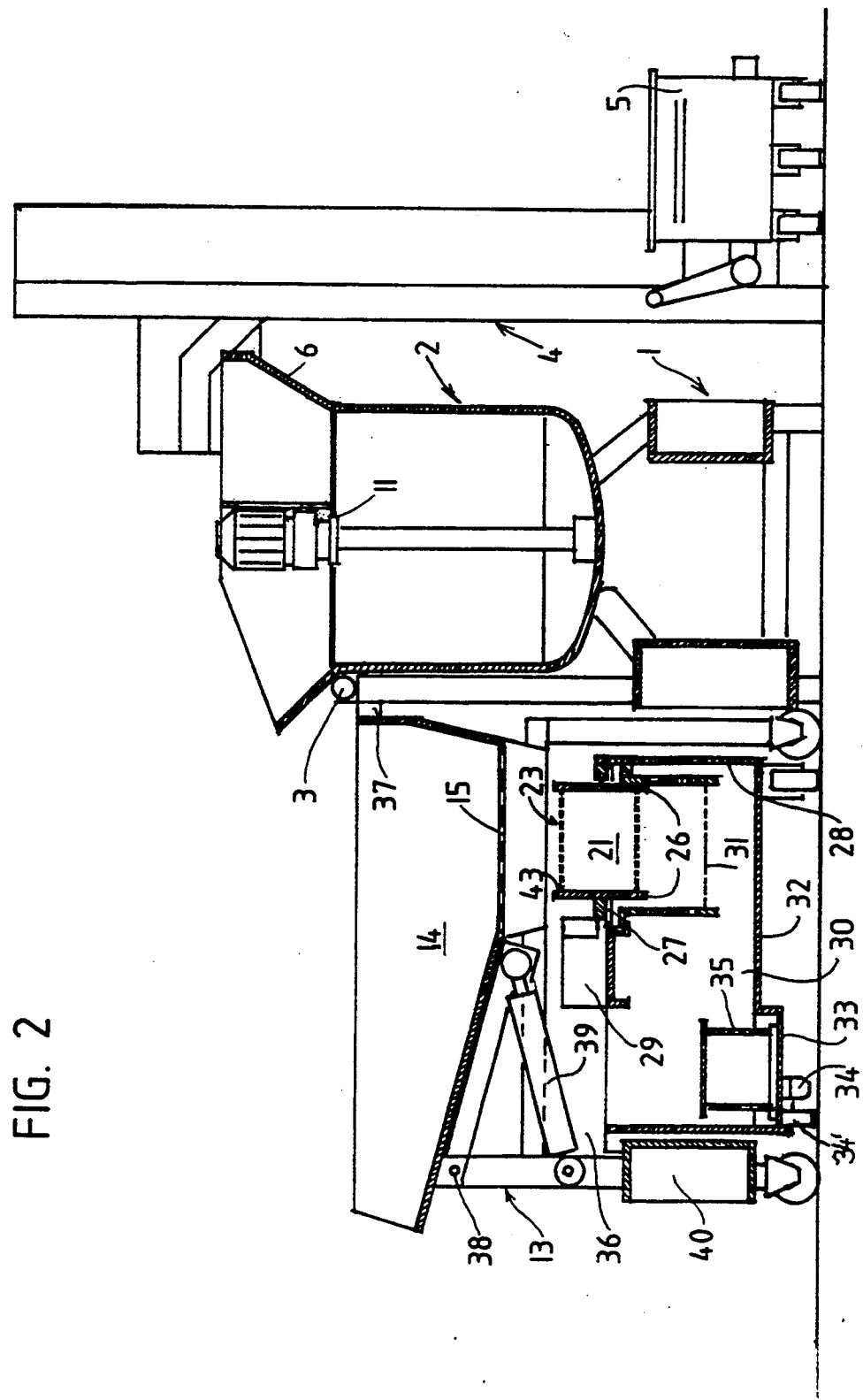
FIG. 2 is a longitudinal section through the apparatus.

The trough 14 can be tilted on the carriage 13 about a horizontal axis 38 between a horizontal rest position shown in solid lines in FIGS. 1 and 2 and a discharge position shown in broken lines in FIG. 1. For this, a hydraulic means 39 is pivotally connected to the carriage 13 as well to the bottom of the trough 14. The hydraulic control means as well as the hydraulic pump and the electric control means are suitably disposed in a common box 40 (FIG. 2), at that end of the carriage 13 which does not face the lift 4, in order to make the box 40 easily accessible. The trough 14 can also be tilted to this side for discharging its content into a truck 41 which can be positioned next to the front end of the carriage 13. Suitably the two tilting axes 3, 38 are parallel to each other.

In operation, the fresh meat bones are delivered with carriage 5, are lifted with lift 4 and are discharged into the receptacle 2 by tilting the carriage 5, the receptacle 2 being in the stirring position shown in solid lines in FIGS. 1 and 2. Simultaneously water and ice are added and the content of the receptacle 2 is intensively stirred with stirring arms 7, preferably in intervals. The speed of the stirring arms can be adjusted and towards the end of the stirring cycle the speed is suitably lowered so that the fat can gather at the surface of the receptacle content. If desired, the receptacle 2 can be held still before it is tilted. If fat floating on the receptacle content is not desired for the further procedure, the receptacle 2 is tilted only far enough that the fat layer can flow into the trough 14. The fat then runs through the coarse sieve 15 onto the rotating sieve 23 for delivery into the trough 25 with the aid of stripper 24 made of a sheet metal.

Following the optional discharge of the fat layer, the receptacle 2 is tilted so that its content falls into the trough 14. When doing this, the receptacle 2 is in the discharge position shown in broken lines in FIG. 1. This tilting is done carefully, or in intervals, to keep it from gushing onto the rotating sieve 23. The coarse sieve 15 separates the bones and the coarser components from the liquid. The fine components which penetrate through the coarse sieve 15 are fed through the gutter 18 or the supply trough 20 laterally to the rotating sieve 23. Flanges 43 extending radially beyond the circumference of the sieve roller 22 prevent the mass supplied from running off. The sieve 23 rotating in the direction of the arrow in FIG. 3 takes along the supplied mass to some extent, the finer and liquid components penetrating through the openings of the circumference 21 of the sieve 23 and reaching the fine filter 31. The coarser components supplied onto the rotating sieve 23 are stripped off by the stripper 24 from the circumference 21 and are fed into the trough 25. By means of the fine sieve 31 a further fractionation is made so that a liquid which contains only very fine solids reaches the collecting container 30 from which it is pumped off through the discharge line 34. This liquid is a flesh-colored, gravy-like soup, the temperature of which can continuously be controlled by thermostats in the collecting container 30. It is suitable to keep this temperature as low as possible and to freeze the obtained soup in blocks or in the form of ice flakes. This product can then be added instead of water and ice to the respective fillings, whereby it is possible to save up to 10% process meat at the cutting process. The obtained product can also be used for the production of other meat products, sauces or soups inasmuch as it contains, besides the residual meat quantities, the components extracted from the bones, such as liquid-proteins (natural liquid-albumen), fine meat fiber masses, collagen, gelatin portions and other useful substances.

The apparatus can easily be operated by only one person. It is possible to exactly control all operation cycles and intervals with a freely program programme by means of a computer and thereby to almost automatize decanting, clarifying, pouring off, filtering and pumping of the obtained product. In their intermeshing condition the separate carriages 13, 28 result in small dimensions of the compactly constructed apparatus. Simultaneously the advantage is obtained that single elements of the apparatus, for example the trough 14 or the collecting container 30, can also be used for other purposes, for example the trough 14 after covering the coarse sieve 15 as a transport carriage for meat, or the collecting container 30 as a container for brine or the like, and so on. Also a separate use of the rotating sieve 23 for special purposes is possible.

Optionally, striking tools may be provided in the receptacle 2, in addition to the stirring arms 7, for subjecting the fresh meat bones floating in the water in the receptacle 2 to impacts.

The diameter of the holes of the coarse filter is about 4 mm, of the rotating sieve 23 is about 1 mm, of the fine filter 31 is about 0.4 mm and of the suction filter 35 is about 1 mm. Since all filters are readily exchangeable, their opening sizes can be changed as may be required.

What is claimed is:

1. Apparatus for extracting nutritive substances from bones comprising a receptacle for the bones and a liquid used for extracting the substances; at least one rotatable stirring member disposed in the receptacle; means for tilting the receptacle about a horizontal axis for the discharge of its contents; a trough carrying a coarse sieve positioned for receiving the contents from the receptacle when it is tilted about the horizontal axis for separating bones and coarse components from liquid and fine components, the trough including an exit; a roller sieve rotatable about a horizontal axis for receiving liquid and fine components from the exit, the rotatable sieve having smaller sieve openings than sieve openings of the coarse sieve and rotating in a given direction; a supply trough between the exit and the rotating sieve for flowing the liquid and fine components from the exit onto an upwardly moving side of the rotating sieve; at least one stripper for removing matter adhering to a surface of the rotating sieve and positioned at a downwardly moving side of the rotating sieve; means for biasing the supply trough and the stripper into engagement with the rotating sieve; and a collection container disposed below the rotating sieve for receiving product comprising liquid and particulates therein which passed through the rotating sieve, the collection container including a discharge conduit for the removal of the product therefrom.

2. Apparatus according to claim 1 wherein at least one of the supply trough and the stripper includes a sliding sieve roller engaging surface made of a synthetic plastics material.

3. Apparatus according to claim 1 wherein the rotating sieve is cylindrical and includes radially oriented flanges attached to the sieve roller.

4. Apparatus according to claim 1 including a fine filter having sieve openings which are smaller than sieve openings of the rotating sieve and disposed in the collecting container below the rotating sieve.

5. Apparatus according to claim 4 including an additional filter provided in the collecting container for the inlet opening of the discharge container.

6. Apparatus according to claim 4 including means for suspending the fine filter in the collecting container.

7. Apparatus according to claim 5 wherein the additional filter comprises a suction filter.

8. Apparatus according to claim 7 including a pump operatively coupled with the discharge conduit for the removal of product from the collecting container.

9. Apparatus according to claim 1 wherein the biasing means includes a spring for the supply trough and a spring for the stripper for biasing them into engagement with the rotating sieve.

10. Apparatus according to claim 1 wherein the extracting liquid in the container comprises water.

11. Apparatus according to claim 1 wherein the sieves extract nutritive substances, including meat adhering to the bones, from the bones.

12. Apparatus according to claim 1 including a frame for supporting the receptacle; a carriage separable from the frame for supporting the trough including the coarse sieve and defining a hollow space; and a further carriage supporting the collecting container and the rotatable sieve, the further carriage being shaped and dimensioned to be movable into and out of the hollow space defined by the carriage.

13. Apparatus according to claim 1 including means tiltably supporting the trough and the coarse sieve carried thereon and permitting tiltable movements of the trough about a horizontal axis from a horizontal position into an inclined discharge position.

14. Apparatus according to claim 13 wherein an axis of the means permitting tiltable movements of the trough and an axis of the means permitting tilting of the receptacle are parallel to each other, and wherein the means for permitting tiltable movements of the trough comprises means for tilting a side of the trough facing away from the receptacle into a relatively downwardly oriented discharge position.

15. Apparatus according to claim 13 including a hydraulic actuator for tilting the trough about the horizontal axis.

* * * * *